(12) United States Patent
Raven et al.

(10) Patent No.: US 9,557,495 B2
(45) Date of Patent: Jan. 31, 2017

(54) FIBRE OPTIC CONNECTOR DEVICE

(71) Applicant: FibreFab Limited, Milton Keynes, Buckinghamshire (GB)

(72) Inventors: Asher Raven, Milton Keynes (GB); Nicholas Blockley, Milton Keys (GB); Alan Keizer, Beachampton (GB)

(73) Assignee: FibreFab Limited, Milton Keynes (GB)

( * ) Notice: Subject to any disclaimer, the term of this patent is extended or adjusted under 35 U.S.C. 154(b) by 0 days.

(21) Appl. No.: 14/434,672

(22) PCT Filed: Oct. 9, 2013

(86) PCT No.: PCT/GB2013/052629
§ 371 (c)(1),
(2) Date: Apr. 9, 2015

(87) PCT Pub. No.: WO2014/057264
PCT Pub. Date: Apr. 17, 2014

(65) Prior Publication Data
US 2015/0277059 A1    Oct. 1, 2015

(30) Foreign Application Priority Data
Oct. 10, 2012    (GB) .................................. 1218194.7

(51) Int. Cl.
*G02B 6/38*    (2006.01)

(52) U.S. Cl.
CPC .......... *G02B 6/3879* (2013.01); *G02B 6/3825* (2013.01); *G02B 6/3831* (2013.01); *G02B 6/3895* (2013.01); *G02B 6/3893* (2013.01)

(58) Field of Classification Search
None
See application file for complete search history.

(56) References Cited

U.S. PATENT DOCUMENTS

| 5,016,968 A | 5/1991 | Hammond et al. |
| 5,134,679 A | 7/1992 | Robin et al. |

(Continued)

FOREIGN PATENT DOCUMENTS

| CN | 1050616 A | 4/1991 |
| CN | 201004102 Y | 1/2008 |

(Continued)

OTHER PUBLICATIONS

International Search Report mailed Apr. 15, 2014 for International application No. PCT/GB2013/052629.

(Continued)

*Primary Examiner* — Mike Stahl
(74) *Attorney, Agent, or Firm* — Fay Sharpe LLP (57) ABSTRACT

A connector device for a fiber optic cable. The connector device includes a housing assembly (5, 25, 31) arranged to house a section of a fiber optic cable (9); a first fiber optic connector (47) including a body (48) that is arranged to receive a first optical fiber; a second fiber optic connector (49) including a body (50) that is arranged to receive a second optical fiber; and attachment mechanism (41, 65) for releasably attaching each of the first and second fiber optic connectors (47, 49) to the housing assembly (5, 25, 31). A fiber optic connector assembly (1) and a method for changing the polarity of first and second optical fibers in a fiber optic cable assembly (1) are also disclosed.

38 Claims, 9 Drawing Sheets

(56) References Cited

U.S. PATENT DOCUMENTS

| | | | |
|---|---|---|---|
| 6,409,392 B1 | 6/2002 | Lampert et al. | |
| 7,380,991 B2 | 6/2008 | Schempp | |
| 8,152,385 B2 | 4/2012 | de Jong et al. | |
| 2011/0299814 A1 | 12/2011 | Nakagawa | |
| 2013/0163934 A1* | 6/2013 | Lee | G02B 6/3879 385/78 |
| 2014/0050443 A1* | 2/2014 | Lee | G02B 6/3879 385/77 |
| 2014/0133808 A1* | 5/2014 | Hill | G02B 6/3826 385/81 |

FOREIGN PATENT DOCUMENTS

| | | |
|---|---|---|
| CN | 102365568 A | 2/2012 |
| WO | WO 01/79904 A2 | 10/2001 |
| WO | WO 2012/058185 A1 | 5/2012 |

OTHER PUBLICATIONS

Written Opinion mailed Apr. 15, 2014 for International application No. PCT/GB2013/052629.
British Search Report dated Jan. 29, 2013 for Application No. GB 1218194.7.
Notice on the First Review Opinions dated Apr. 11, 2014 issued by the State Intellectual Property Office of the P.R.C. for Application No. 201210459418X.

* cited by examiner

FIBRE OPTIC CONNECTOR DEVICE

FIELD

The present invention relates to a connector device for a fibre optic cable, in particular, but not exclusively, a duplex fibre optic cable; a fibre optic cable assembly; and a method for changing the polarity of first and second optical fibres in a fibre optic cable assembly.

BACKGROUND

In data communications systems fibre optic cables having a plurality of fibre optic cables are frequently used to connect between communications nodes. Typically the fibre optic cable assembly includes a pair of optical fibres, one for transmitting and one for receiving (typically the receiving fibre is labelled A and the transmitting fibre is labelled B). The overall net effect of the data communications cabling is that the transmitting cables B have to connect with receiving ports A, and receiving cables A have to connect with transmitting ports B. However, during installation, it is not uncommon for the installers to get confused between the transmitting and receiving cables and a cross over can occur such that the transmitting cables B are not connected with receiving port A, and vice versa. For many connector types, installers are prevented from simply unplugging the duplex cable connectors and reinserting them in another orientation because the connectors are uni-directional and therefore can only be inserted into the complementary receiving ports in one orientation. Thus it is necessary for the installer to replace the existing cable or remove the connecting head from the fibres and effectively remanufacture the cable on site, which is very cumbersome and time consuming.

This problem has been addressed in US 2011/0299814 and U.S. Pat. No. 8,152,385. In each of these documents the solution is to provide a duplex cable having first and second fibre optic cable connectors that are each rotatably mounted to a housing, independently of the other. This is a relatively complex solution for a cable assembly is mass produced and requires relatively precise and robust engineering to ensure that the fibre optic connectors retain their axial alignment within the housing, and are only rotated when required to do so. Therefore it is desirable to provide a simplified solution to the above-mentioned problem.

Another problem with duplex type fibre optic connectors is that when plugged into the receiving ports it can be difficult to remove the cable assembly. This is because the connectors are usually plugged into a panel having a high density of connectors, which means there is limited space around each connector. Thus it can be difficult for a user to manipulate the locking levers when removing the connector from the panel.

U.S. Pat. No. 8,152,385 and US2011/0299814 have each addressed this problem by providing an additional lever that is arranged to actuate the locking levers. The additional lever is separate from the locking levers and is attached to an upper surface of the connector body. While this provides a reasonably satisfactory means of actuation, with the specific arrangements disclosed, it is still necessary for the user to position his finger relatively close to the locking levers in order to operate the additional lever, particularly in the arrangement shown in US2011/0299814.

Thus there is a desire to provide a fibre optic cable assembly that includes an improved means of actuating the fibre optic connector locking levers.

A further problem with known fibre optic cable assemblies is that each assembly design tends to be bespoke for each different type of fibre optic connector. This leads to increased manufacturing and assembly costs. It is highly desirable to have a connector system that includes a connector body that can be used with several different types of fibre optic connectors in order to reduce manufacturing and assembly costs.

While these problems mainly occur in the data communications industry, the invention also has applicability to telecommunications industry, and any other situation where fibre optic cables are connected together.

SUMMARY

Accordingly the present invention seeks to provide an improved connector device, fibre optic cable assembly and a method for changing the polarity of first and second optical fibres in a fibre optic cable assembly that mitigates at least one of the aforementioned problems, or at least provides an alternative to existing approaches.

According to one aspect of the invention there is provided a connector device for a fibre optic cable according to claim 1. The invention enables the first and second fibre optic connectors to be separable from the housing assembly, thereby enabling the user to reverse the polarity of first and second optical fibres with respect to the first and second fibre optic connectors.

The connector device includes a housing assembly arranged to house a section of a fibre optic cable; a first fibre optic connector including a body that is arranged to receive a first optical fibre; a second fibre optic connector including a body that is arranged to receive a second optical fibre; and attachment means for releasably attaching each of the first and second fibre optic connectors to the housing assembly.

The first and second fibre optic connectors are releasably attachable to the housing assembly in a first orientation, and are releasably attachable to the housing assembly a second orientation, said second orientation being different from said first orientation. This enables the polarity of the first and second optical fibres to be changed with respect to a receiving complementary connector.

The first and second fibre optic connectors are releasably attachable to the housing assembly in a first orientation such that the first and second optical fibres have a first polarity with respect to the first and second fibre optic connectors, and are releasably attachable to the housing assembly in a second orientation such that the first and second optical fibres have a second polarity with respect to the first and second fibre optic connectors, said second polarity being different from said first polarity. For example, in the first orientation, the first fibre optic connector is mounted over the first optical fibre and the second fibre optic connector is mounted over the second optical fibre. In the second orientation, the first fibre optic connector is mounted over the second optical fibre and the second fibre optic connector is mounted over the first optical fibre. This changes the polarity of the first and second optical fibres with respect to the first and second optical connectors, and hence to the complementary connector device. Therefore the invention enables the polarity of the optical fibres in a duplex fibre optic cable assembly to be changed quickly and easily, while providing a simple structure for manufacture.

Advantageously the first and second fibre optic connectors can be connected together, the arrangement being such that the first and second connectors are releasably attachable to the housing assembly as a unit. This provides the fibre optic connector device with a leading end unit that is detachably mounted to the housing assembly. This is a more convenient and quicker way of attaching a plurality of fibre optic connectors to the housing assembly than having to change the orientation of each fibre optic connector individually.

The first and second fibre optic connectors are preferably connected together by a connector member. The connector member is releasably attachable to the housing assembly thereby releasably attaching the first and second fibre optic connectors to the housing assembly. The connector member is arranged to be mounted onto at least a part of the housing assembly. The connector members is arranged to receive the leading end of the housing assembly. The connector member can include a tubular bay that is arranged to receive the leading end of the housing. This provides a secure connection and reduces the possibility of the fibre optic connectors being misaligned with respect to the housing assembly.

As an alternative to the connectors being connected together, the first and second fibre optic connectors can be releasably attachable to the housing assembly independently of each other. This enables the orientation of each fibre optic connector to be changed with respect to each of the optical fibres. For example, the first fibre optic connector can be mounted over the first optical fibre in first and second orientations. The first fibre optic cable can be mounted over the second optical fibre in first and second orientations. The second fibre optic connector can be mounted over the second optical fibre in first and second orientations. The second fibre optic connector can be mounted over the first optical fibre in first and second orientations.

Advantageously the attachment means can include at least one locking member for releasably attaching at least one of the first and second fibre optic connectors to the housing assembly. The or each locking member is movable from a first position wherein at least one of the first and second fibre optic connectors is secured to the housing assembly, to a second position wherein at least one of the first and second fibre optic connectors is separable from the housing assembly. Advantageously the attachment means can include first and second locking members that are arranged to releasably attach the first and second fibre optic connectors to the housing assembly. In preferred embodiments, the or each locking member is arranged to releasably attach the connector member to the housing assembly.

One of the housing assembly and a part that is releasably attachable to the housing assembly, such as the connector member, includes the at least one locking member and the other of the housing assembly and the part that is releasably attachable to the housing assembly includes a locking engagement formation. For example, the lock engagement formation can be female, such as a hole or recess, or male such as a detent. In preferred embodiments, the or each locking member is included in the housing and the formations are included in the connector member. Having the locking members in the housing provides easier access for a user to actuate the locking member(s). This is particularly useful in high density applications where it is difficult for a user to get access to the fibre optic connector device. It will be appreciated by the skilled person that the housing can include at least one locking member and at least one locking formation. It will be appreciated by the skilled person that the part that is releasably attachable to the housing can include at least one locking member and at least one locking formation.

In preferred embodiments, the housing includes a first side wall. The first side wall can include a first locking member, and the part that is releasably connectable to the housing includes a first lock engagement formation that is arranged for engagement with the first locking member.

In preferred embodiments, the housing includes a second side wall. The second side wall can include a second locking member, and the part that is releasably attachable to the housing includes a second lock engagement formation that is arranged for engagement with the second locking member.

The or each locking member can be integral with the housing or the part that is releasably attachable to the housing assembly.

The or each locking member can be resilient.

Advantageously each of the first and second fibre optic connectors can include means for releasably attaching itself to a complementary connector device.

Advantageously the connector device includes a manually operable control for actuating the means for releasably attaching the fibre optic connectors to the complementary connector device.

Advantageously the manually operable control is arranged for sliding movement. This is a convenient way of actuating the connector devices that is easily operated by the user in high density applications.

Advantageously the manually operable control is mounted to a part that is releasably attachable to the housing assembly. For example, the manually operable control can be mounted to the leading end unit, for example via the connector member, and is arranged for sliding movement relative to the leading end unit. Advantageously the leading end unit, and preferably the connector member, includes a channel and the manually operable control is arranged to slide within the channel.

The first fibre optic connector includes a first locking element for releasably attaching the first fibre optic connector to the complementary connector device. The second fibre optic connector includes a second locking element for releasably attaching the second fibre optic connector to the complementary connector device. The manually operable control is arranged to actuate the first and second locking elements. Advantageously the first and second locking elements are actuated substantially simultaneously.

For example, the first fibre optic connector can include a first body and the first locking element is arranged inclined to a first surface of the first body in its rest orientation, which is typically the locking orientation. The second fibre optic connector can include a second body and the second locking element is arranged inclined to a first surface of the second body in its rest orientation, which is typically the locking orientation. The first locking element is arranged substantially in-line with the longitudinal axis of the body of the first fibre optic connector. The second locking element is arranged substantially in-line with the longitudinal axis of the body of the second fibre optic connector.

The first and second locking elements can be connected together by a cross-piece.

The manually operable control is arranged to slide between a first position wherein each of the first and second locking members are in locking orientations, and a second position wherein each of the first and second locking members are in unlocked orientations.

The manually operable control is arranged to slide in a direction away from the first and second locking members when moving to the second position. The manually operable control is arranged to slide along an axis that is substantially aligned with the longitudinal axis of the connector device.

Advantageously the sliding movement of the manually operable control is limited by the interaction of at least the manually operable control and the first and second locking members. This limits movement in an efficient manner. Advantageously the sliding movement of the manually operable control can be limited by the interaction of the connector member, for example a surface over which the manually operable control is arranged to slide.

The first and second locking elements can be resilient, and the resiliency of the first and second locking members can be arranged to urge the manually operable control to its first position.

The manually operable control can include a first actuator element that is arranged to move over an upper surface of the first locking element in order to move the first locking element between locking and unlocked orientations. The arrangement is such that when the manually operable control is moved towards its second position the actuator element forces the first element downwards thereby moving it into an unlocked orientation wherein a user can remove the connector from the complementary connector.

The manually operable control can include a second actuator element that is arranged to move over an upper surface of the second locking element in order to move the second locking element. The arrangement is such that when the manually operable control is moved towards its second position the actuator element forces the second element downwards thereby moving it into an unlocked orientation wherein a user can remove the connector from the complementary connector.

The actuator elements can be integrated into a single component.

Advantageously the first and second actuator elements operate the first and second locking elements substantially simultaneously.

The manually operable control can include a substantially planar member.

In some embodiments a support member protrudes from the substantially planar member and the first and second actuator elements are connected to the support member.

In some embodiments the first and second actuator members are located towards peripheral portions of the substantially planar member.

Preferably the actuator elements each include a cam profile.

In some embodiments, the first fibre optic connector includes a first resilient locking element for releasably attaching the body to the complementary connector device, the second fibre optic connector includes a second resilient locking element for releasably attaching the body to the complementary connector device, the manually operable control connects the first and second locking elements together such that operation of the control operates the first and second locking elements substantially simultaneously. This provides a single control that actuates both the first and second locking elements. The manual control also extends the normal length of the locking elements, which makes it easier to actuate the elements when there is a high density of fibre optic connector assemblies. This control is operated by pressing instead of sliding.

The housing can include first and second apertures at a leading end. The first optical fibre passes through the first aperture. The second optical fibre passes through the second aperture. The housing can include a furcation member to direct the first and second optical fibres to their respective apertures.

The housing includes a first aperture at a trailing end for receipt of the first and second optical fibres. The width of the housing tapers in a narrowing fashion towards the trailing end of the housing.

The housing includes first and second parts that are arranged to snap fit together, in a releasable manner. This provides access to the interior of the housing.

Advantageously the housing assembly can include a first inner body arranged to support the first optical fibre. The first inner body protrudes from the housing. The first inner body includes a through bore, which is preferably arranged along the longitudinal axis of the first inner body. The first inner body is preferably substantially cuboid, and optionally can have a substantially square cross-section. The first inner body is mounted such that a first end protrudes into the housing through the first aperture in the leading end of the housing. The rotational orientation of the first inner body is fixed with respect to the housing. The first inner body can include first a first shoulder portion that is arranged to engage with a slot formed in the housing adjacent the first aperture in the leading end. The first shoulder portion prevents rotational movement of the inner body with respect to the housing. The inner body can include a second shoulder portion that engages an outer face of the housing. The second shoulder portion helps to retain the axial alignment of the first inner body. The first optical fibre passes through the first inner body.

Advantageously the housing assembly can include a second inner body arranged to support the second optical fibre. The second inner body protrudes from the housing. The second inner body includes a through bore, which is preferably arranged along the longitudinal axis of the second inner body. The second inner body is preferably substantially cuboid, and optionally can have a substantially square cross-section. The second inner body is mounted such that a first end protrudes into the housing through the second aperture in the leading end of the housing. The rotational orientation of the second inner body is fixed with respect to the housing. The second inner body can include first a first shoulder portion that is arranged to engage with a slot formed in the housing adjacent the second aperture in the leading end. The first shoulder portion prevents rotational movement of the inner body with respect to the housing. The inner body can include a second shoulder portion that engages an outer face of the housing. The second shoulder portion helps to retain the axial alignment of the second inner body. The first optical fibre passes through the first inner body.

Advantageously the first fibre optic connector can be mounted to the housing assembly over the first inner body. The first fibre optic connector includes a recess that is arranged to accommodate the first inner body. This arrangement enables different types of fibre optic connectors to be mounted on the inner bodies, which enables a single inner body arrangement to be applicable to several different types of fibre optic connectors. Advantageously the form of the recess is arranged substantially complementary to the outer form of the first inner body.

Advantageously the second fibre optic connector is mounted to the housing assembly over the second inner body. The second fibre optic connector includes a recess that is arranged to accommodate the second inner body. This arrangement enables different types of fibre optic connectors to be mounted on the inner bodies, which enables a single body arrangement to be applicable to several different types of fibre optic connectors. Advantageously the form of the recess is arranged substantially complementary to the outer form of the second inner body.

The first optical fibre includes a first ferrule attached to its connecting end. The second optical fibre includes a second ferrule attached to its connecting end.

Advantageously the first fibre optic connector is arranged to be mounted interchangeably on the first and second inner bodies, and the second fibre optic connector is arranged to be mounted interchangeably on the first and second inner bodies. Advantageously the first and second inner bodies can be similar.

According to another aspect of the invention there is provided a fibre optic cable assembly, including a connector device according to any configuration described herein connected to a fibre optic cable.

The fibre optic cable includes a first optical fibre. The first optical fibre includes a first ferrule. The fibre optic cable includes a second optical fibre. The second optical fibre includes a second ferrule.

The cable protrudes into the housing via the aperture in the trailing end. The first and second fibres furcate in the housing. The first optical fibre passes through the first aperture in the leading end of the housing. The first optical fibre passes through the first inner body.

The second optical fibre passes through the second aperture in the leading end of the housing. The second optical fibre passes through the second inner body. For embodiments wherein the first and second fibre optic connectors are connected together in a unit, the first fibre optic connector is mounted over the first inner body in the first condition, and the second fibre optic connector is mounted over the second body in the first condition. The second fibre optic connector is mounted over the first inner body in a second condition, and the first fibre optic connector is mounted over the second inner body in the second condition.

Advantageously the first ferrule is attached to the housing assembly in a manner wherein its position is fixed with respect to the housing assembly. By position it is meant its translation position and its rotational orientation. Advantageously the first ferrule can be keyed to the first inner body.

Advantageously the second ferrule is attached to the housing assembly in a manner wherein its position is fixed with respect to the housing assembly. By position it is meant its translation position and its rotational orientation. Advantageously the second ferrule can be keyed to the second inner body.

Keying the ferrules to their respective bodies is useful for applications wherein the ferrule includes an angled tip, and wherein it is necessary to fix the orientation of the tip to the housing assembly.

According to another aspect of the invention there is provided a method for changing the polarity of first and second optical fibres in a fibre optic cable assembly according to claim 36.

The method can include inverting the orientation of the first and second fibre optic connectors. For example, in embodiments where the first and second fibre optic connectors are connected together, the first and second fibre optic connectors can be rotated through 180 degrees about a longitudinal axis of the fibre optic connector assembly. This effectively moves the first fibre optic connector to a position wherein it is mountable on the second optical fibre, and moves the second fibre optic connector to a position wherein it is mountable on the first optical fibre.

According to another aspect of the invention there is provided a connector device for optical fibres, including: a first fibre optic connector including a body that is arranged to receive a first optical fibre and a first locking element for releasably locking the first fibre optic connector to a complementary connector; a second fibre optic connector including a body that is arranged to receive a second optical fibre and a second locking element for releasably locking the second fibre optic connector to a complementary connector; and a manually operable control for actuating the first and second locking elements, said manually operable control being arranged for sliding movement between a first position wherein the first and second locking elements are in a locking condition to a second position wherein the first and second locking elements are in an unlocked condition, wherein the extent of sliding movement of the manually operable control is limited by the interaction between the manually operable control and the first and second locking elements.

This is a particularly effective and efficient way of limiting the sliding movement of the manually operable control. The free ends of the first and second locking elements interact with an actuator part (or actuator parts) of the manually operable control, which effectively block further sliding movement.

Advantageously the manually operable control can be arranged to slide in a direction away from the first and second locking members to move the second position. The manually operable control is arranged to slide along an axis that is substantially aligned with the longitudinal axis of the connector device.

Advantageously the first and second fibre optic connectors can be connected together by a connector member and the sliding movement of the manually operable control is further limited by the interaction of the connector member. Effectively, the free ends of the first and second locking elements are sandwiched between at least one actuator part (and preferably a plurality of actuator parts) and a part of the connector member, which resists further sliding movement. Preferably the part of the connector member is a surface over which the control slides.

Advantageously the first and second locking elements can be resilient, and the resiliency of the first and second locking members urges the manually operable control to its first position.

Advantageously the manually operable control can include a first actuator element that is arranged to move over an upper surface of the first locking element in order to move the first locking element between the locking and orientations. The arrangement is such that when the manually operable control is moved towards its second position the actuator element forces the first element downwards thereby moving it into an unlocked orientation wherein a user can remove the connector from the complementary connector.

Advantageously the manually operable control can include a second actuator element that is arranged to move over an upper surface of the second locking element in order to move the second locking element. The arrangement is such that when the manually operable control is moved towards its second position the actuator element forces the second element downwards thereby moving it into an unlocked orientation wherein a user can remove the connector from the complementary connector. Advantageously the first and second actuator elements operate the first and second locking elements substantially simultaneously.

Advantageously the manually operable control can include a substantially planar member.

In some embodiments a support member protrudes from the substantially planar member, and wherein the first and second actuator elements are connected to the support member.

In some embodiments the first and second actuator elements are located towards peripheral portions of the substantially planar member.

Advantageously the actuator elements include a cam profile.

Advantageously the connector device can be arranged to any configuration described herein, for example it can include the way in which the first and second fibre optic connectors are releasably attachable the housing assembly.

BRIEF DESCRIPTION OF THE DRAWINGS

Embodiments of the present invention will now be described, by way of example only, with reference to the accompanying drawings in which.

DETAILED DESCRIPTION

Figure 1:
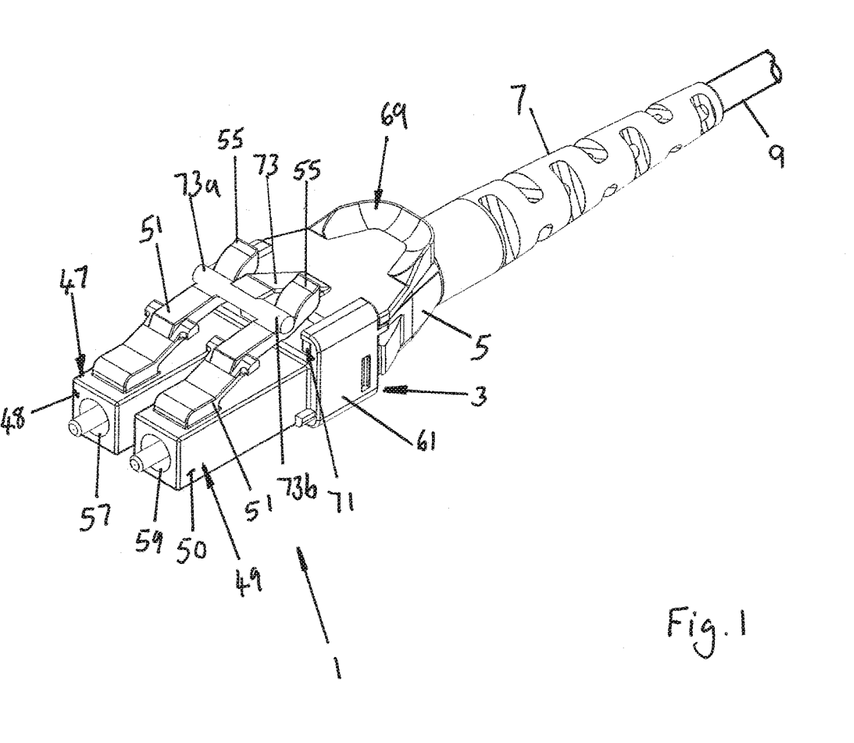
FIG. 1 is an isometric view of a fibre optic connector assembly in accordance with a first embodiment of the invention.

FIG. 1 shows a fibre optic cable assembly 1 in accordance with the invention. The embodiment shown is in the form of a duplex fibre optic cable assembly.

The duplex fibre optic cable assembly 1 includes a leading end unit 3, a housing 5, a boot 7, and a duplex fibre optic cable 9.

Figure 3:
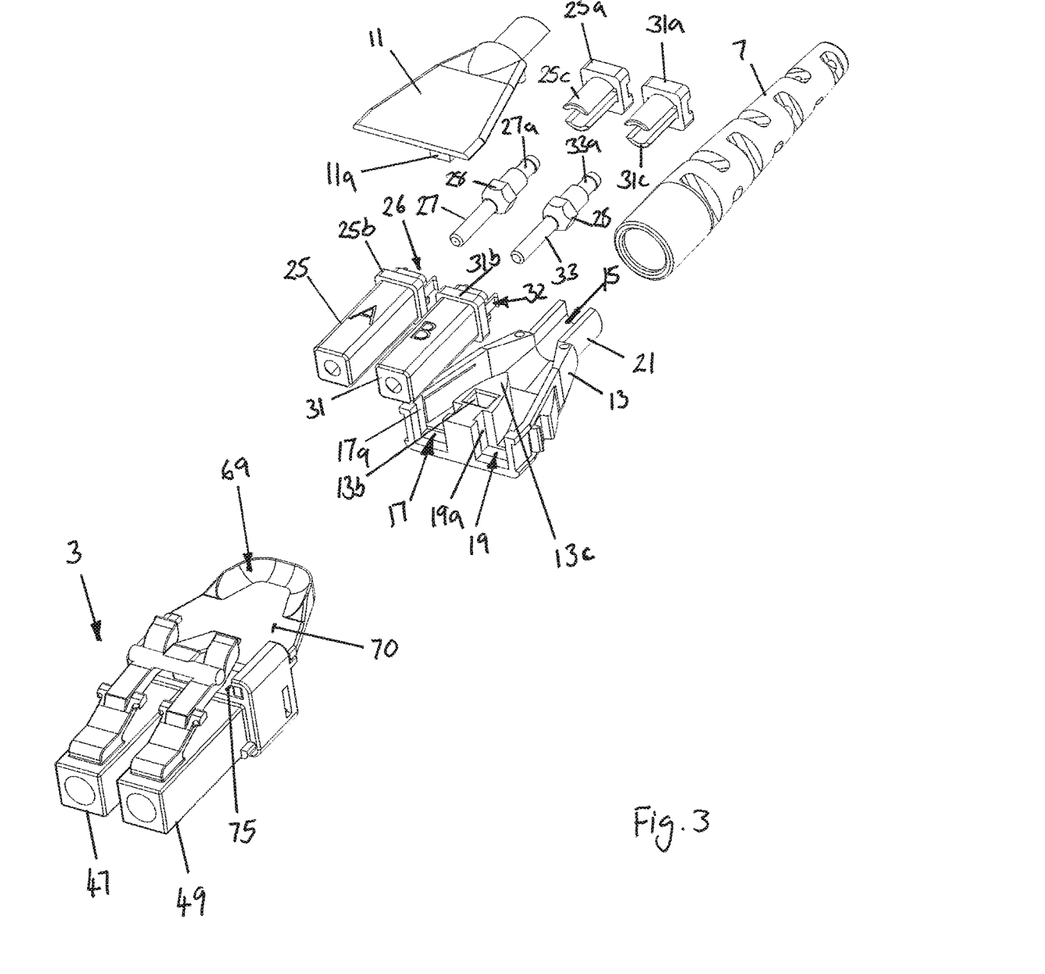
FIG. 3 is an isometric exploded view of the embodiment of FIG. 1 with a fibre optic cable omitted for clarity.

The housing 5 comprises first and second parts 11,13 that are arranged to snap fit together in a releasable manner via snap fit connectors 11a,13b (see FIG. 3). The housing 5 includes a trailing end aperture 15 and first and second leading end apertures 17,19. A section of the fibre optic cable 9 is housed within the housing 5. The cable 9 is inserted into the housing via the trailing end aperture 15. The boot 7 overlies a portion of the cable 9 and a trailing portion 21 of the housing.

The cable 9 furcates inside the housing into first and second optical fibres (not shown) adjacent furcation member 13c. The first optical fibre exits the housing 5 via the first aperture 17 in the leading end and the second optical fibre exits the housing 5 via the second aperture 19 in the leading end. The first optical fibre is a receiving fibre (A) and the second optical fibre is a transmitting fibre (B).

Figure 5:
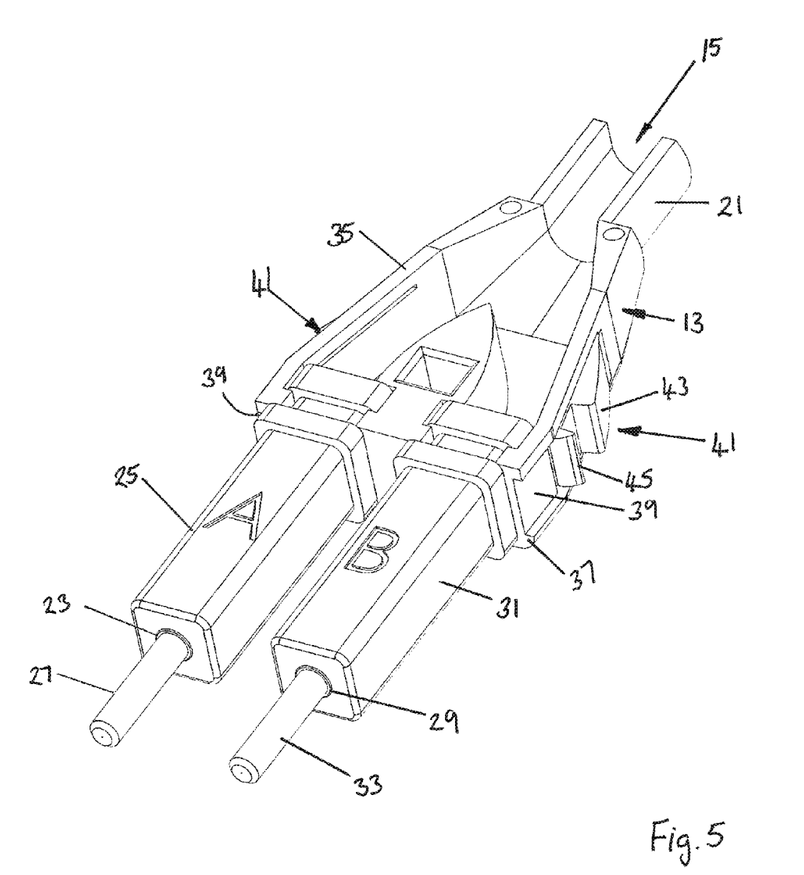
FIG. 5 is an enlarged isometric view of part of the fibre optic cable assembly with some components omitted to provide a view of the interior of a housing.

The first optical fibre is threaded into a bore 23 formed in a first inner body 25 and the end of the fibre is connected to a first ferrule 27. The first inner body 25 protrudes from the housing 5 via the first aperture 17. The arrangement is such that when the first part of the housing 11 is separated from the second part of the housing 13 the first body 25 is removable from, and insertable into, the housing 5. The connection between the first body 25 and the housing 5 is such that the orientation of the first body 25 is fixed with respect to the housing. The first inner body 25 includes first and second shoulder portions 25a,25b. The first shoulder portion 25a is inserted into a slot 17a formed adjacent the first aperture 17. This retains the rotational orientation and translational position of the first inner body 25 with respect to the housing 5. The second shoulder portion 25b abuts the housing 5 and assists in maintaining the alignment of the body 25 with respect to the housing.

The first shoulder portion 25a is a separate component from the first inner body 25 and is releasably attachable thereto via a latching arrangement 26. The first shoulder portion 25a includes a split connector portion 25c that is arranged to fit into the bore 23 and to receive a tail end 27a of the first ferrule, including a hexagonal formation 28. The interaction between the split connector portion 25c and the hexagonal formation 28 keys the first ferrule 27 to the first inner body 25, that is, fixes its rotational orientation and translational position with respect to the inner body 25, and hence the housing 5.

The first ferrule 27 protrudes out of the bore 23 formed in the first body 25.

The second optical fibre is threaded into a bore 29 formed in a second inner body 31. The end of the second optical fibre is connected to a second ferrule 33, which protrudes from the bore 29. The second inner body 31 protrudes from the housing 5 via the second aperture 19. The second inner body 31 is attached to the housing 5 in a similar fashion to the first body 25, wherein a first shoulder portion 31a is inserted into a slot 19a adjacent the second aperture 19.

The first shoulder portion 31a includes a split connector portion 31c, which is arranged to receive a tail end 33a of the second ferrule in a similar fashion to the first inner body.

When the first part of the housing 11 is fitted to the second part of the housing 13, the first and second bodies 25,31 are held firmly in the housing 5 such that they protrude through the first and second apertures 17,19 respectively.

The housing 5 and first and second inner bodies 25,31 together form a housing assembly.

The housing 5 includes side walls 35,37. Each of the side walls 35,37 includes a mating groove 39. Each side wall 35,37 includes a latch 41 formed integrally therewith, which is located adjacent its respective groove 39. Each latch 41 is resilient. Each latch 41 is attached to its respective side wall 35,37 in a cantilevered manner. Each latch 41 includes a pressing part 43 and a latching part 45. Each latching part 45 is arranged to engage with a latching formation 65 on the leading end unit 3 in order to attach the leading end unit to the housing 5. The leading end unit 3 can be separated from the housing 5 by depressing the pressing parts 43, which moves the latching parts 45 out of engagement with their respective latching formations 65 on the leading end unit 3.

The housing 5 has a tapered trailing end. This allows easier access to the latching elements 41.

The leading end unit 3 includes first and second fibre optic connectors 47,49. The first and second fibre optic connectors 47,49 are in the LC format. The first and second fibre optic connectors 47,49 are arranged substantially parallel to one another.

Figure 4:
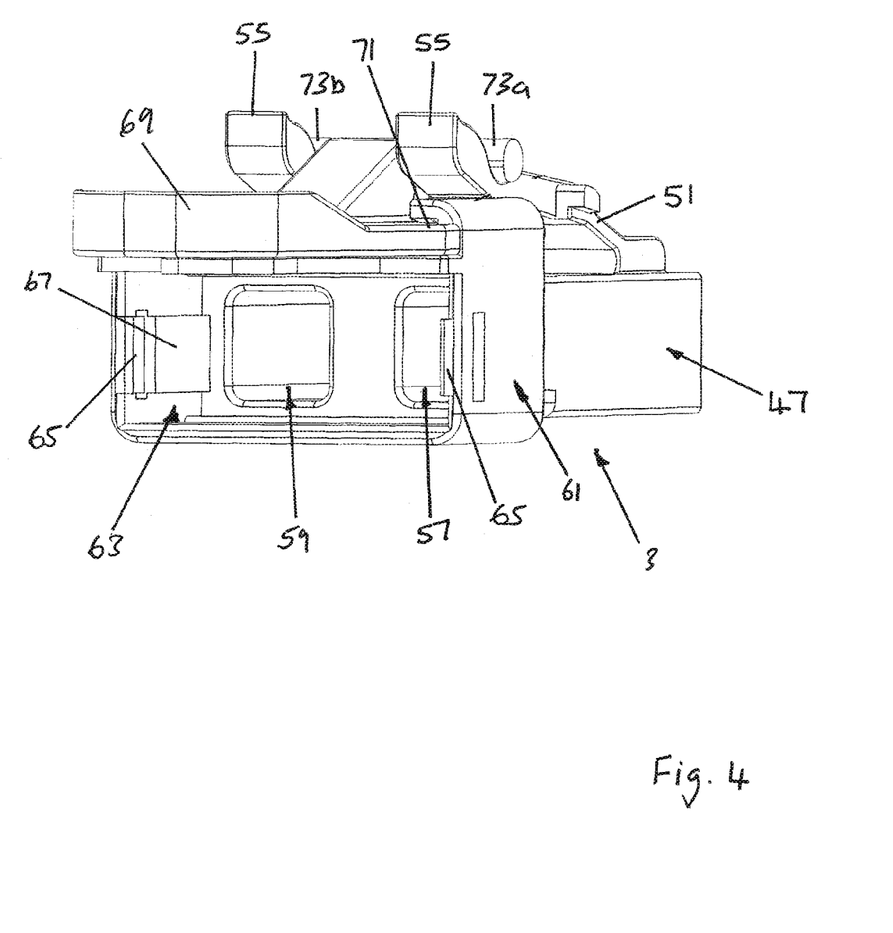
FIG. 4 is an enlarged rear view of a leading end of the fibre optic connector assembly.

The first fibre optic connector 47 includes a first body 48. The second fibre optic connector 49 includes a second body 50. The first body 48 includes a first cavity 57 that is arranged to receive one of the inner bodies 25,31 and the second body 50 includes a second cavity 59 arranged to receive the other of the inner bodies 25,31. The arrangement is such that the ferrules 27,33 protrude out of the first and second bodies 48,50 via cavities 57 and 59.

The leading end unit 3 includes a connector part 61 that is arranged to connect the first and second fibre optic connectors 47,49 together. Preferably, the connector part 61 is formed integrally with the first and second fibre optic connectors 47,49. The first and second fibre optic connectors 47,49 are connected to the connector part 61 such that their respective latching levers 51 have substantially the same orientation. The connector part 61 provides an open-sided docking bay 63 that is arranged to be mounted onto the leading end of the housing 5. The leading end unit 3 includes latching formations 65 that are arranged to engage with respective latching parts 45 included in the housing 5. The leading end unit 3 includes ribs 67 that are arranged to engage with the mating grooves 39 on the housing. The arrangement is such that the leading end unit 3 can slide onto the leading end of the housing so that the ribs 67 slide along the mating grooves 39 until latching formations 65 engage with their respective latching parts 45, thereby releasably locking the leading end unit 3 to the housing 5.

As the leading end unit 3 is mounted onto the housing 5, the first and second inner bodies 25,31 slide into their respective cavities 59,57. When the leading end unit 3 is fully mounted onto the housing 5, the ferrules 27,33 protrude from their respective cavities 59,57.

The leading end unit 3 is detachable from the housing 5 by the user operating the latches 41. This disengages the latching parts 45 from the latching formations 65 and enables the leading end unit 3 to slide off the housing 5 and inner bodies 25,31. Thus the leading end unit 3 is fully separable from the housing assembly.

Each of the first and second fibre optic connectors 47,49 includes a latching lever 51 that is arranged to releasably lock the respective fibre optic connector device to a complementary connector device. Each latching lever 51 is arranged to engage a complementary formation in order to lock the connector to the complementary connector. Each lever 51 includes a locking formation 51a that is located in a mid-portion of the locking lever 51.

Figure 2:
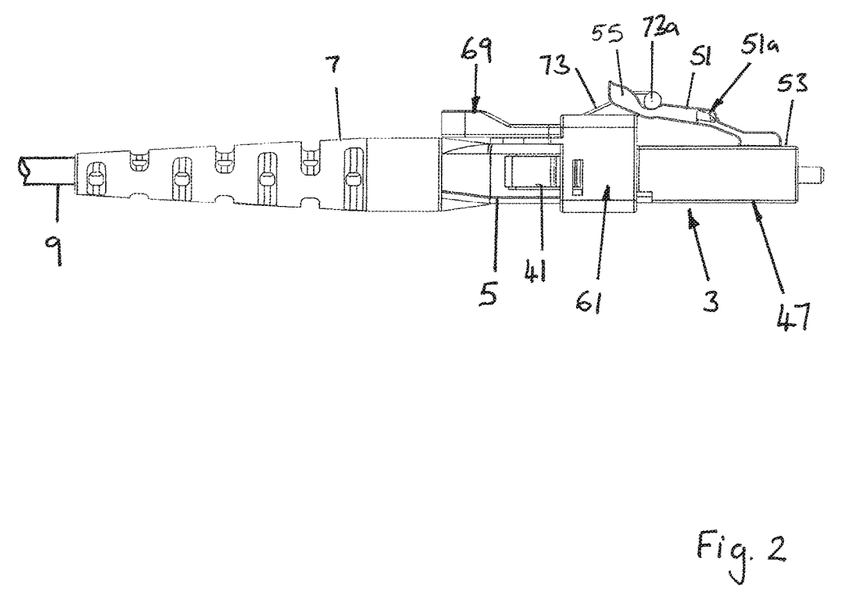
FIG. 2 is a side view of the embodiment of FIG. 1.

Each latching lever 51 is attached to an upper surface 53 of the connector 47,49. Each lever 51 is arranged in a cantilevered manner. Each lever 51 is resilient. Each lever 51 can be moved from a locking position to an unlocked position. The unlocked position is achieved by pushing a free end 55 of the latching lever downwards towards the upper surface 53. The resiliency of the latching levers 51 returns them to their rest positions when an actuating force is removed.

Each latching lever 51 is arranged substantially in line with the longitudinal axis of its respective body 48,50.

The device further includes a manually operable control 69 that is arranged to actuate the latching levers 51 on the first and second fibre optic connectors 47,49 substantially simultaneously. The manually operable control 69 is arranged to slide with respect to the leading end unit 3 between a first position wherein the levers 51 are in a locking condition to a second position wherein the levers are in an unlocked condition.

The manually operable control 69 slides within grooves 71 formed within the connector part 61. The manually operable control 69 includes an actuator 73 that is attached to an upper surface 70 of the control. The actuator 73 includes actuator members 73a,73b that each sit on top of one of the latching levers 51. The actuator 73 supports the actuator members 73a,73b. The actuator members 73a,b move with the manually operable control 69 and therefore sliding the manually operable control 69 causes the latching levers 51 to be pushed downwards towards the upper surfaces 53 of the fibre optic connectors 47,49. The extent of sliding movement of the manually operable control 69 is limited by the interaction between the actuator members 73a,73b, the free ends 55 of the latching levers 51 and an upper surface 75 of the connector member 61. As the control 69 is moved towards the unlocking position, the upper surface 75 becomes exposed, the latching levers 51 are depressed and their lower surfaces engage the upper surface 75 of the connector part 61 and cannot be pushed down any further. The free ends 55 of the latching levers then block further movement of the manually operable control 69.

A method for changing the polarity of the first and second optical fibres with respect to the first and second fibre optic connectors 47,49 will now be described.

The fibre optic cable assembly 1 is typically arranged in an initial condition such that the leading end unit 3 is attached to the housing 5 with the first fibre optic connector 47 mounted over the first inner body 25, and hence first optical fibre, and with the second fibre optic connector 49 mounted over the second inner body 31, and hence the second optical fibre (see FIG. 1).

Figure 6:
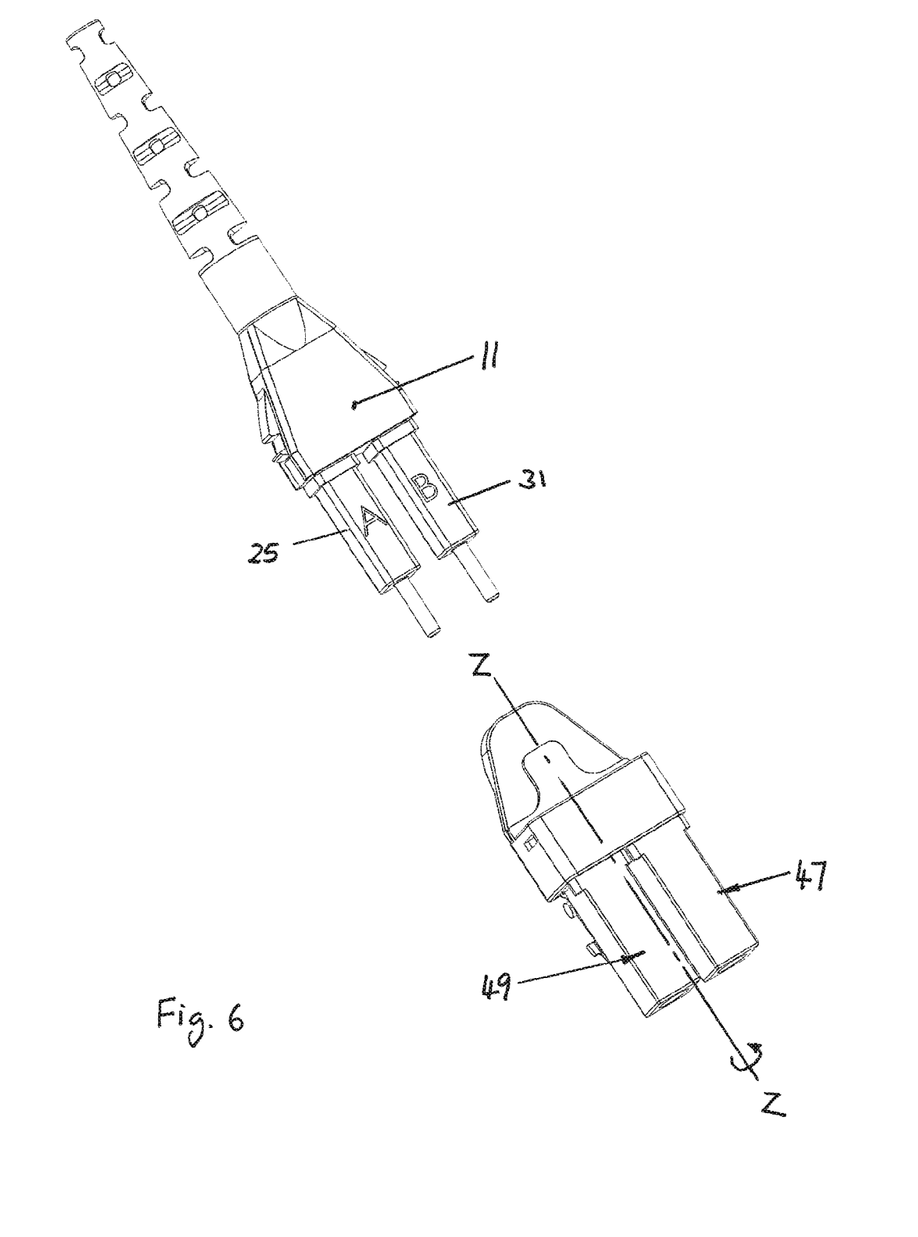
FIG. 6 is an isometric view of the embodiment of FIG. 1 with the leading end separated from the housing, and the leading end having been rotated through 180° about a longitudinal axis.
Figure 7:
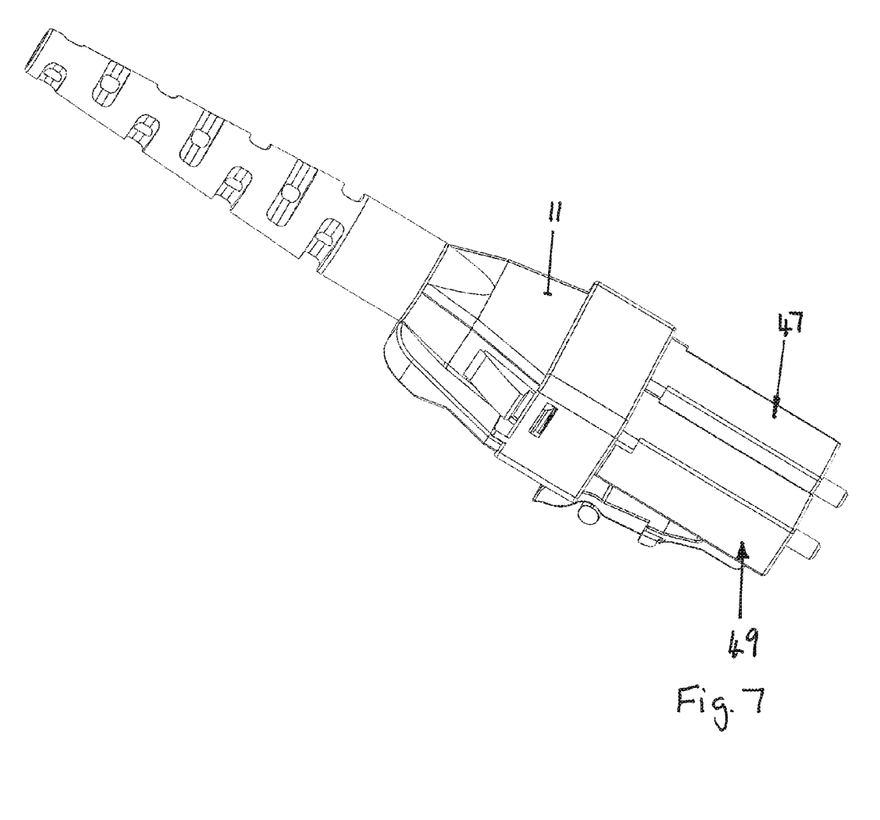
FIG. 7 is an isometric view of an underside of the embodiment of FIG. 1 with the leading end reattached after having been rotated through 180° about the longitudinal axis.

The leading end unit 3 is separated from the housing 5 by actuating latches 41. The leading end unit is rotated through 180° about a longitudinal axis Z-Z (see FIG. 6) and is reattached to the housing 5 in a second orientation that is inverted with respect to the initial orientation (see FIG. 7). In the second orientation the polarity of the first and second optical fibres is reversed with respect to the first and second fibre optic connectors 47,49. That is, the first optical fibre, first inner body 25 and first ferrule 27 are located in the second fibre optic connector 49, and the second fibre optic cable, second inner body 31 and second ferrule 33 are located in the first fibre optic connector 47.

Thus a user is able to easily change the polarity of the duplex fibre optic cable assembly by simply removing the leading end unit 3 and changing its orientation with respect to the housing assembly, thereby changing the polarity of the transmitting and receiving fibre optic cables with respect to the complementary connector.

It will be appreciated by the skilled person that it is possible to change the orientation of the leading end unit 3 with respect to the housing by rotating the housing 5 instead of the leading end unit 3.

Figure 8:
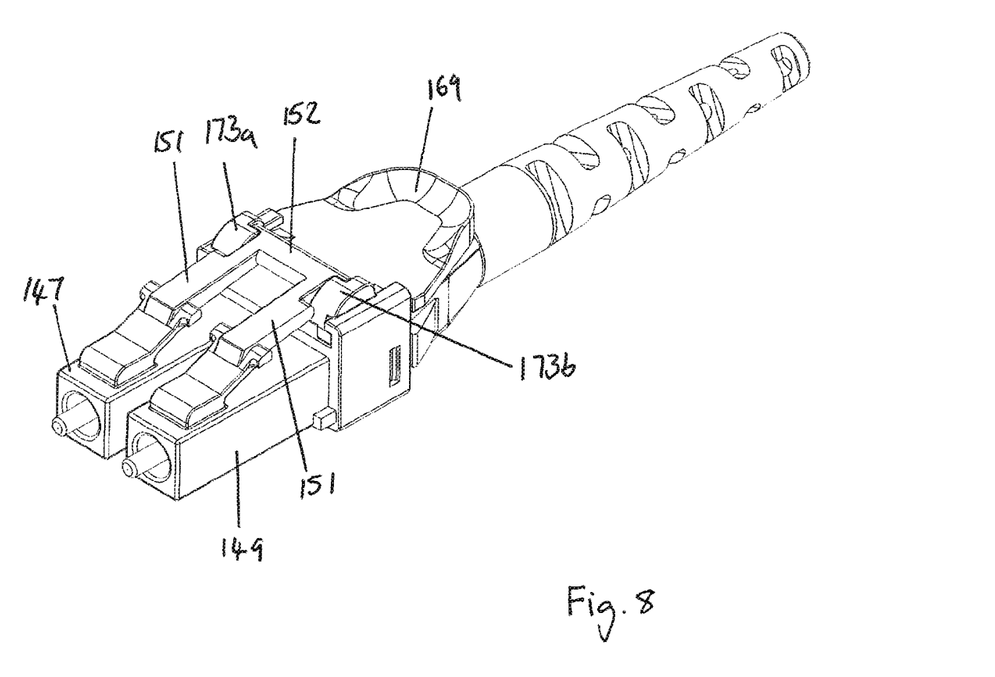
FIG. 8 is an isometric view of a fibre optic connector assembly in accordance with a second embodiment of the invention.
Figure 9:
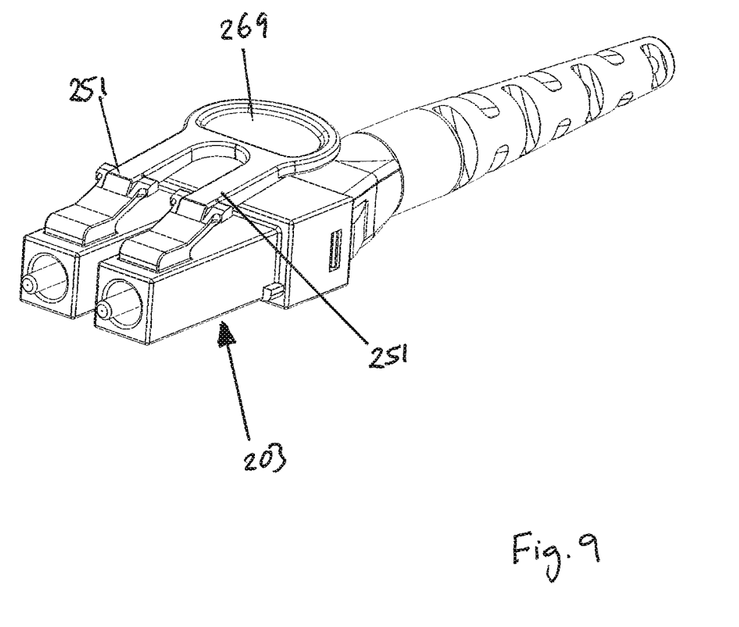
FIG. 9 is an isometric view of a fibre optic connector assembly in accordance with a third embodiment of the invention.

FIG. 8 shows a second embodiment of the invention. FIG. 9 shows a second duplex fibre optic cable assembly. The second embodiment is similar to the first embodiment except that the latching levers 151 are connected by a cross piece 152 and the actuator members 73a,73b in the first embodiment, are replaced by actuating cams 173a,173b, which provide a similar actuating function to the latching levers 151. Thus as the manually operable control 169 slides away from the first and second fibre optic connectors 147,149 the actuator cams 173a,173b act on the cross piece 152 which causes the latching levers 151 to move from a locking condition to an unlocked condition. In this embodiment, the extent of the sliding movement of manually operable control 169 is limited by the interaction of the cross piece 152 and the actuator cams 173a and 173b.

FIG. 9 shows a third duplex fibre optic cable assembly in accordance with the invention. The third embodiment is similar to the first and second embodiments, except that the leading end unit 203 does not include a sliding manually operable control, but rather includes extended latching levers 251 and a pressing part 269 that is arranged to actuate both of the latching levers 251 substantially simultaneously. In other respects, the third embodiment is similar to the first and second embodiments.

It will be apparent to the skilled person that modifications can be made to the above embodiments that fall within the scope of the invention, for example while the embodiments described with reference to a to duplex fibre optic cables, its general teachings are applicable to fibre optic cable assemblies having at least two optical fibres.

Instead of using LC type fibre optic connectors, other fibre optic connector formats can be used, for example SC . . . etc The housing latching elements 41 can be included in the leading end unit 3. The latching formations 65 can be included in the housing 5. However it is preferred to have the latching elements 41 in the housing 5, and particularly towards the trailing end of the housing 5, for ease of access, particularly in high density applications.

The fibre optic connectors 47, 49 do not have to be connected together to form the leading end unit 3. The fibre optic connectors 47,49 can be individual connectors that are each individually releasably attachable to the housing 5, for example by way of latches that operate similarly to latches 41. This enables the orientation of each fibre optic connector 47,49 to be changeable with respect to the housing 5 independently of the other fibre optic connector 47,49. In this arrangement, it is possible to change the polarity of the first and second optical fibres with respect to the complementary receiving connector, without having to change the polarity of the first and second optical fibres with respect to the first and second fibre optic connectors 47,49. That is, the first fibre optic connector 47 that is mounted on the first inner body 25, can be detached from the first inner body 25, inverted (rotated through 180° about its longitudinal axis), and then reattached to the first inner body 25. Similarly, the second fibre optic connector 49 that is mounted on the second inner body 31 can be detached from the second inner body 31, inverted (rotated through 180° about its longitudinal axis), and reattached to the second inner body 31. Since the first and second fibre optic connectors 47,49 are independently releasably mountable to the housing 5, provided that the releasable attachment means are similar, it is possible to mount the first fibre optic connector 47 onto the second inner body 31 and the second fibre optic connector 49 onto the first inner body 27, and thereby change the polarity of the first and second optical fibres with respect to the first and second fibre optic connectors 47,49. This provides greater interchangeability, however requires more steps to change the orientation of the first and second fibre optic connectors 47,49 than when they are connected together to form a single unit 3.

The invention claimed is:

1. A connector device for a fibre optic cable, said connector device comprising:
a housing assembly arranged to house a section of a fibre optic cable;
a first fibre optic connector including a body that is arranged to receive a first optical fibre;
a second fibre optic connector including a body that is arranged to receive a second optical fibre;
wherein the first and second fibre optic connectors are connected together, the arrangement being such that the first and second connectors are releasably attachable to the housing assembly as a unit; and
wherein the unit is attachable to the housing assembly in a first orientation such that the first and second fibre optic connectors have a first polarity with respect to first and second optical fibres, and in a second orientation such that the first and second fibre optic connectors have a second polarity with respect to the first and second optical fibres, said second polarity being different from said first polarity.

2. A connector device according to claim 1, wherein in the first orientation, the first fibre optic connector is mounted over the first optical fibre and the second fibre optic connector is mounted over the second optical fibre.

3. A connector device according to claim 2, wherein in the second orientation, the first fibre optic connector is mounted over the second optical fibre and the second fibre optic connector is mounted over the first optical fibre.

4. A connector device according to claim 1, wherein the first and second fibre optic connectors are connected together by a connector member.

5. A connector device according to claim 4, wherein the connector member is releasably attachable to the housing assembly thereby releasably attaching the first and second fibre optic connectors to the housing assembly.

6. A connector device according to claim 5, wherein the connector member is mountable onto at least a part of the housing assembly.

7. A connector device according to claim 1, including at least one locking member for releasably attaching the first and second fibre optic connectors to the housing assembly.

8. A connector device according to claim 7, wherein one of the housing assembly and a part that is releasably attachable to the housing assembly includes the at least one locking member and the other of the housing assembly and the part that is releasably attachable to the housing assembly includes a locking engagement formation.

9. A connector device according to claim 8, wherein the housing assembly includes a first side wall, the first side wall includes a first locking member, and the part that is releasably connectable to the housing assembly includes a first lock engagement formation that is arranged for engagement with the first locking member.

10. A connector device according to claim 9, wherein the housing assembly includes a second side wall, the second side wall includes a second locking member, and the part that is releasably attachable to the housing assembly includes a second lock engagement formation that is arranged for engagement with the second locking member.

11. A connector device according to claim 7, wherein the or each locking member is integral with the housing assembly or the part that is releasably connectable to the housing assembly respectively.

12. A connector device according to claim 7, wherein the or each locking member is resilient.

13. A connector device according to claim 1, wherein each of the first and second fibre optic connectors includes means for releasably attaching itself to a complementary connector device.

14. A connector device according to claim 1, wherein the first fibre optic connector includes a first locking element for releasably attaching the first fibre optic connector to a complementary connector device, and the second fibre optic connector includes a second locking element for releasably attaching the second fibre optic connector to the complementary connector device.

15. A connector device according to claim 1, wherein the first fibre optic connector includes a first resilient locking element for releasably attaching the body to a complementary connector device, the second fibre optic connector includes a second resilient locking element for releasably attaching the body to the complementary connector device, a manually operable control connects the first and second locking elements together such that operation of the control operates the first and second locking elements substantially simultaneously.

16. A connector device according to claim 1, wherein the housing assembly includes first and second apertures at a leading end.

17. A connector device according to claim 1, wherein the housing assembly includes a first inner body arranged to support the first optical fibre and a second inner body arranged to support the second optical fibre.

18. A connector device according to claim 17, wherein the first fibre optic connector is mounted to the housing assembly over the first inner body in the first orientation and is mounted to the housing assembly over the second inner body in the second orientation.

19. A connector device according to claim 18, wherein the second fibre optic connector is mounted to the housing assembly over the second inner body in the first orientation and is mounted over the first inner body in the second orientation.

20. A fibre optic cable assembly, including: a connector device and a fibre optic cable, said connector device comprising:
   a housing assembly arranged to house a section of a fibre optic cable;
   a first fibre optic connector including a body that is arranged to receive a first optical fibre;
   a second fibre optic connector including a body that is arranged to receive a second optical fibre;
   wherein the first and second fibre optic connectors are connected together, the arrangement being such that the first and second connectors are releasably attachable to the housing assembly as a unit; and
   wherein the unit is attachable to the housing assembly in a first orientation such that the first and second fibre optic connectors have a first polarity with respect to first and second optical fibres, and in a second orientation such that the first and second fibre optic connectors have a second polarity with respect to the first and second optical fibres, said second polarity being different from said first polarity.

21. A fibre optic cable assembly according to claim 20, wherein the fibre optic cable includes a first optical fibre having a first ferrule and a second optical fibre having a second ferrule, wherein the first ferrule protrudes from the first fibre optic connector and the second ferrule protrudes from the second fibre optic connector.

22. A fibre optic cable assembly according to claim 21, wherein the first ferrule is attached to the housing assembly in a manner wherein its position is fixed with respect to the housing assembly.

23. A fibre optic cable assembly according to claim 21, wherein the second ferrule is attached to the housing assembly in a manner wherein its position is fixed with respect to the housing assembly.

24. A connector device for a fibre optic cable, said connector device comprising:
   a housing assembly arranged to house a section of a fibre optic cable;
   a first fibre optic connector including a body that is arranged to receive a first optical fibre, and a first locking element for releasably attaching the first fibre optic connector to a complementary connector device;
   a second fibre optic connector including a body that is arranged to receive a second optical fibre, and a second locking element for releasably attaching the second fibre optic connector to the complementary connector device;
   wherein the first and second fibre optic connectors are connected together, the arrangement being such that the first and second connectors are releasably attachable to the housing assembly as a unit;
   the unit is attachable to the housing assembly in a first orientation wherein the first fibre optic connector is mounted over the first optical fibre and the second fibre optic connector is mounted over the second optical fibre such that the first and second fibre optic connectors have a first polarity with respect to first and second optical fibres; and
   the unit is attachable to the housing assembly in a second orientation wherein the first fibre optic connector is mounted over the second optical fibre and the second fibre optic connector is mounted over the first optical fibre, such that the first and second fibre optic connectors have a second polarity with respect to the first and second optical fibres, said second polarity being different from said first polarity.

25. A connector device according to claim 1, wherein the first and second fibre optic connectors are connected together by a connector member, the connector member is releasably attachable to the housing assembly, one of the housing assembly and the connector member includes at least one locking member and the other of the housing assembly and the connector member includes a locking engagement formation.

26. A connector device according to claim 14, wherein the first locking element comprises a latching lever cantilevered to the first fibre optic connector and the second locking element comprise a latching lever cantilevered to the second fibre optic connector.

27. A connector device according to claim 14, including a manually operable control arranged to actuate the first and second locking elements.

28. A connector device according to claim 27, wherein the manually operable control is mounted to a part that is releasably attachable to the housing assembly.

29. A connector device according to claim 27, wherein the manually operable control is arranged for sliding movement.

30. A connector device according to claim 29, wherein the manually operable control is arranged to slide between a first position wherein each of the first and second locking members are in locking orientations, and a second position wherein each of the first and second locking members are in unlocked orientations.

31. A connector device according to claim 30, wherein the manually operable control is arranged to slide in a direction away from the first and second locking members when moving to the second position.

32. A connector device according to claim 29, wherein sliding movement of the manually operable control is limited by the interaction of the manually operable control and the first and second locking members.

33. A connector device according to claim 29, wherein the first and second fibre optic connectors are connected together by a connector member and the sliding movement of the manually operable control is limited by the interaction of the connector member.

34. A connector device according to claim 30, wherein the first and second locking elements are resilient, and the resiliency of the first and second locking members urges the manually operable control to its first position.

35. A connector device according to claim 29, wherein the manually operable control includes a first actuator element that is arranged to move over an upper surface of the first locking element in order to move the first locking element between locking and unlocked orientations.

36. A connector device according to claim 35, wherein the manually operable control includes a second actuator element that is arranged to move over an upper surface of the second locking element in order to move the second locking element between locking and unlocked orientations.

37. A connector device according to claim 36, wherein the manually operable control includes a substantially planar member and a support member protruding from the substantially planar member, and wherein the first and second actuator elements are connected to the support member.

38. A connector device according to claim 37, wherein the first and second actuator elements are located towards peripheral portions of the substantially planar member.

\* \* \* \* \*